(12) United States Patent
Vajravel et al.

(10) Patent No.: US 12,406,056 B2
(45) Date of Patent: Sep. 2, 2025

(54) PROVIDING QUALITY OF SERVICE FOR SECURE WORKSPACES HAVING COPY-ON-WRITE LAYERS

(71) Applicant: Dell Products L.P., Round Rock, TX (US)

(72) Inventors: Gokul Thiruchengode Vajravel, Bangalore (IN); Ramanujam Kaniyar Venkatesh, Bangalore (IN); Jyothi Bandakka, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 397 days.

(21) Appl. No.: 18/164,725

(22) Filed: Feb. 6, 2023

(65) Prior Publication Data
US 2024/0265095 A1    Aug. 8, 2024

(51) Int. Cl.
*G06F 21/53* (2013.01)
(52) U.S. Cl.
CPC ........ *G06F 21/53* (2013.01); *G06F 2221/033* (2013.01)
(58) Field of Classification Search
CPC ...................................................... G06F 21/53
USPC ................................................................ 726/22
See application file for complete search history.

(56) References Cited

U.S. PATENT DOCUMENTS

| | | | | |
|---|---|---|---|---|
| 7,386,662 | B1 * | 6/2008 | Kekre | G06F 3/067 711/113 |
| 7,430,568 | B1 * | 9/2008 | DeKoning | G06F 11/0727 |
| 7,529,897 | B1 * | 5/2009 | Waldspurger | G06F 11/1482 714/13 |
| 7,636,801 | B1 * | 12/2009 | Kekre | H04L 67/1097 709/239 |
| 8,327,187 | B1 * | 12/2012 | Metcalf | G06F 9/4825 714/10 |
| 10,721,290 | B2 * | 7/2020 | Gill | H04L 67/10 |
| 11,036,677 | B1 * | 6/2021 | Grunwald | G06F 21/78 |
| 11,089,105 | B1 * | 8/2021 | Karumbunathan | G06F 16/275 |
| 11,640,340 | B2 * | 5/2023 | Sontakke | G06F 11/1471 714/4.11 |
| 12,181,981 | B1 * | 12/2024 | Heidemeyer | G06F 11/1469 |
| 12,289,332 | B2 * | 4/2025 | Palmer | H04L 63/0245 |
| 2010/0122052 | A1 * | 5/2010 | Waldspurger | G06F 12/16 718/1 |

(Continued)

OTHER PUBLICATIONS

Rui Zhang; Effective Quality of Service Differentiation for Real-world Storage Systems;IEEE;2010, pp. 443 454.*

*Primary Examiner* — Monjur Rahim
(74) *Attorney, Agent, or Firm* — Kirton McConkie; Brian Tucker (57) ABSTRACT

Quality of service for secure workspaces having copy-on-write layers is provided. A priority filter can be loaded above an isolation filter and can be configured to evaluate I/O requests targeting copy-on-write layers to determine a priority of each I/O request. The priority filter can allow a high priority I/O request to be serviced immediately. In contrast, the priority filter can store a lower priority I/O request in a queue until high priority I/O requests have been serviced. In this way, an application in a secure workspace assigned a high priority will retain the ability to write data to its copy-on-write layer even when the copy-on-write layer is limited by a quota and other applications in the same or different secure workspace are consuming the quota.

20 Claims, 10 Drawing Sheets

(56) References Cited

U.S. PATENT DOCUMENTS

| | | | |
|---|---|---|---|
| 2013/0227236 A1* | 8/2013 | Flynn | G06F 12/0292 |
| | | | 711/172 |
| 2014/0337565 A1* | 11/2014 | Kimmel | G06F 3/0685 |
| | | | 711/114 |
| 2016/0359955 A1* | 12/2016 | Gill | G06F 9/45558 |
| 2017/0031933 A1* | 2/2017 | Xie | G06F 16/128 |
| 2017/0293428 A1* | 10/2017 | Radovanovic | G06F 3/0634 |
| 2018/0196832 A1* | 7/2018 | Maybee | G06F 3/065 |
| 2021/0208863 A1* | 7/2021 | Kuriata | G06F 12/0238 |
| 2022/0138223 A1* | 5/2022 | Sonner | G06F 11/2097 |
| | | | 707/620 |
| 2022/0335009 A1* | 10/2022 | Paul | G06F 16/11 |
| 2023/0080046 A1* | 3/2023 | Paul | G06F 16/128 |
| | | | 707/822 |
| 2024/0205198 A1* | 6/2024 | Sood | H04L 63/0428 |

\* cited by examiner

PROVIDING QUALITY OF SERVICE FOR SECURE WORKSPACES HAVING COPY-ON-WRITE LAYERS

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine or a software-based container. An application hosted in a secure workspace will be isolated from resources in the external environment and from other applications or services hosted external to the secure workspace.

Secure workspaces are oftentimes configured to use a copy-on-write layer to enable sharing of images from which the secure workspaces are deployed and to provide security. When a copy-on-write layer is employed, any writes that a secure workspace may make will be directed to the copy-on-write layer as opposed to the underlying layer(s) defining the image from which the secure workspace is created. The copy-on-write layer is typically discarded when the secure workspace is exited.

A quota is oftentimes defined for copy-on-write layers, such as to prevent excessive consumption of the host computing device's resources. For example, an administrator or end user could define a quota of 512 MB of RAM for the copy-on-write layers of all secure workspaces that may be deployed on a user computing device. Such quotas can create various problems.

As one example, when multiple secure workspaces are deployed on a user computing device and a quota is defined for the copy-on-write layers of the secure workspaces, one of the secure workspaces may consume most of the quota leaving other secure workspace(s) with insufficient resources to function properly. For example, a secure workspace that hosts Chrome may consume most of the resources allocated to copy-on-write layers thereby causing a secure workspace hosting Outlook to be unable to perform writes that are necessary for proper functioning of Outlook.

As another example, when a single secure workspace hosts multiple applications, one of the applications may consume most of the quota for the copy-on-write layer thereby leaving other application(s) in the secure workspace with insufficient resources. For example, if both Chrome and Outlook are hosted in the same secure workspace, Chrome could consume too much of the copy-on-write layer thus preventing Outlook from functioning properly such as by having its writes denied or delayed due to the copy-on-write layer having reached the quota.

As a further example, if one secure workspace has consumed excessive amounts of the quota for copy-on-write layers, it is possible that another secure workspace will fail to start due to inadequate resources. For example, if a secure workspace hosting Chrome has been running for some time when a secure workspace hosting Outlook is to be started, the secure workspace hosting Chrome may have consumed so much of the quota for copy-on-write layers that the secure workspace hosting Outlook may have insufficient resources to start.

In each of the above examples, the user will typically prefer having Outlook function properly rather than Chrome. Accordingly, the use of quotas for copy-on-write layers oftentimes degrades the user experience.

BRIEF SUMMARY

The present invention extends to systems, methods and computer program products for providing quality of service for secure workspaces having copy-on-write layers. A priority filter can be loaded above an isolation filter and can be configured to evaluate I/O requests targeting copy-on-write layers to determine a priority of each I/O request. The priority filter can allow a high priority I/O request to be serviced immediately. In contrast, the priority filter can store a lower priority I/O request in a queue until high priority I/O requests have been serviced. In this way, an application in a secure workspace assigned a high priority will retain the ability to write data to its copy-on-write layer even when the copy-on-write layer is limited by a quota and other applications in the same or different secure workspace are consuming the quota.

In some embodiments, the present invention may be implemented by a priority filter as a method for providing quality of service for secure workspaces having copy-on-write layers. The priority filter may receive a first write that targets a first copy-on-write layer. The priority filter may determine that the first write is associated with a first priority. The priority filter may allow the first write to be serviced immediately. The priority filter may receive a second write that targets a second copy-on-write layer. The priority filter may determine that the second write is associated with a second priority. The priority filter may prevent the second write from being serviced immediately.

In some embodiments, the present invention may be implemented as computer storage media storing computer executable instructions which when executed implement a priority filter that is configured to perform a method for providing quality of service for secure workspaces having copy-on-write layers. The priority filter may obtain priority configurations. The priority filter may receive writes that target one or more copy-on-write layers. The priority filter may evaluate the writes against the priority configurations. When the write filter determines that a source of a write is associated with a high priority, the priority filter can cause the write to be serviced immediately. When the priority filter determines that a source of a write is associated with a lower priority, the priority filter can prevent the write from being serviced immediately.

In some embodiments, the present invention may be implemented as a system that includes a management server and one or more user computing devices. Each user computing device may include a host agent that receives priority configurations from the management server. Each user computing device may also include a priority filter that is configured to perform a method for providing quality of service for secure workspaces having copy-on-write layers. The priority filter may receive the priority configurations from the host agent. The priority filter may receive writes that target the copy-on-write layers from the secure workspaces. The priority filter may evaluate the writes against the priority configurations. When the priority filter determines that a write is associated with a high priority, the priority filter can cause the write to be serviced immediately. When the priority filter determines that a write is associated with a lower priority, the priority filter can prevent the write from being serviced immediately.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "write" in the context of an I/O request is intended to encompass any I/O request that may create, modify, or delete content on a copy-on-write layer. A "user computing device" could be a desktop, laptop, thin client, tablet, smart phone, or any other computing device capable of performing the functionality described herein.

Figure 1:
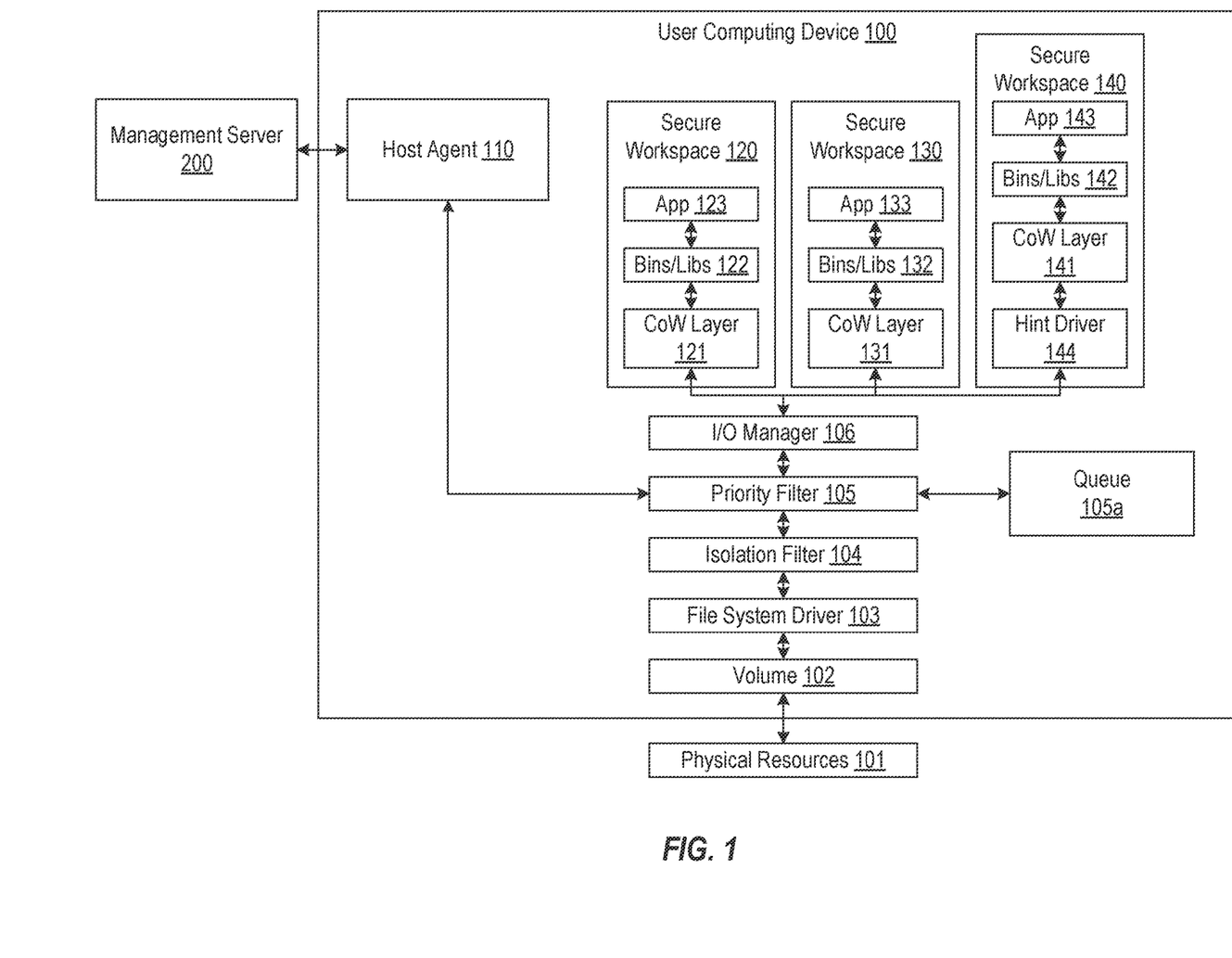
FIG. 1 provides an example of a computing environment in which embodiments of the present invention may be implemented.

FIG. 1 provides an example of a computing environment in which one or more embodiments of the present invention may be implemented. This computing environment includes a user computing device 100 and a management server 200 which is used to manage user computing device 100. Although only a single user computing device 100 is shown, management server 200 may typically be used to manage a large number of user computing devices, any or all of which could be configured in the same manner as user computing device 100 to thereby provide quality of service for secure workspaces having copy-on-write layers in accordance with embodiments of the present invention.

User computing device 100 is shown as including or having access to physical resources 101 which can represent any storage media such as memory or disk storage on which the content of copy-on-write layers are stored. An I/O subsystem provides access to physical resources 101 and may include a volume 102, a file system driver 103, an isolation filter 104, and an I/O manager 106. Isolation filter 104 functions to provide isolation to secure workspaces on user computing device 100.

User computing device 100 is shown as including three secure workspaces. Secure workspace 120 can represent a software-based container and includes a copy-on-write (CoW) layer 121, binaries/libraries 122, and app 123. Secure workspace 130 can represent another software-based container and includes a copy-on-write (CoW) layer 131, binaries/libraries 132, and app 133. Secure workspace 140 can represent a hardware-based secure workspace (e.g., a virtual machine) and includes a copy-on-write (CoW) layer 141, binaries/libraries 142, and app 143. Secure workspace 140 may also include a hint driver 144 to provide the functionality described below.

Although copy-on-write layers 121, 131, and 141 are shown as part of their respective secure workspaces, the content of these copy-on-write layers is stored on physical resources 101 and a quota may limit the amount of physical resources 101 these copy-on-write layers can consume as described in the background. In accordance with embodiments of the present invention, user computing device 100 may include a priority filter 105 which implements a queue 105a and is configured to provide quality of service for secure workspaces 120, 130, and 140 or any other secure workspace on user computing device 100 that employs a copy-on-write layer. User computing device 100 may also include a host agent 110 that can be used to configure priority filter 105. In some embodiments, an administrator may use management server 200 to interface with host agent 110 for purposes of configuring priority filter 105.

As an overview, priority filter 105 can be loaded above isolation filter 104 so that it receives I/O requests that originate in secure workspaces before isolation filter 104. Priority filter 105 can evaluate the I/O requests to determine a priority of each I/O request that targets a copy-on-write layer. Priority filter 105 can allow a high priority I/O request to be serviced immediately. In contrast, priority filter 105 can store a lower priority I/O request in queue 105a until high priority I/O requests have been serviced. In this way, an application in a secure workspace assigned a high priority will retain the ability to write data to its copy-on-write layer even when the copy-on-write layer is limited by a quota and other applications in the same or different secure workspace are consuming the quota.

Figure 2:
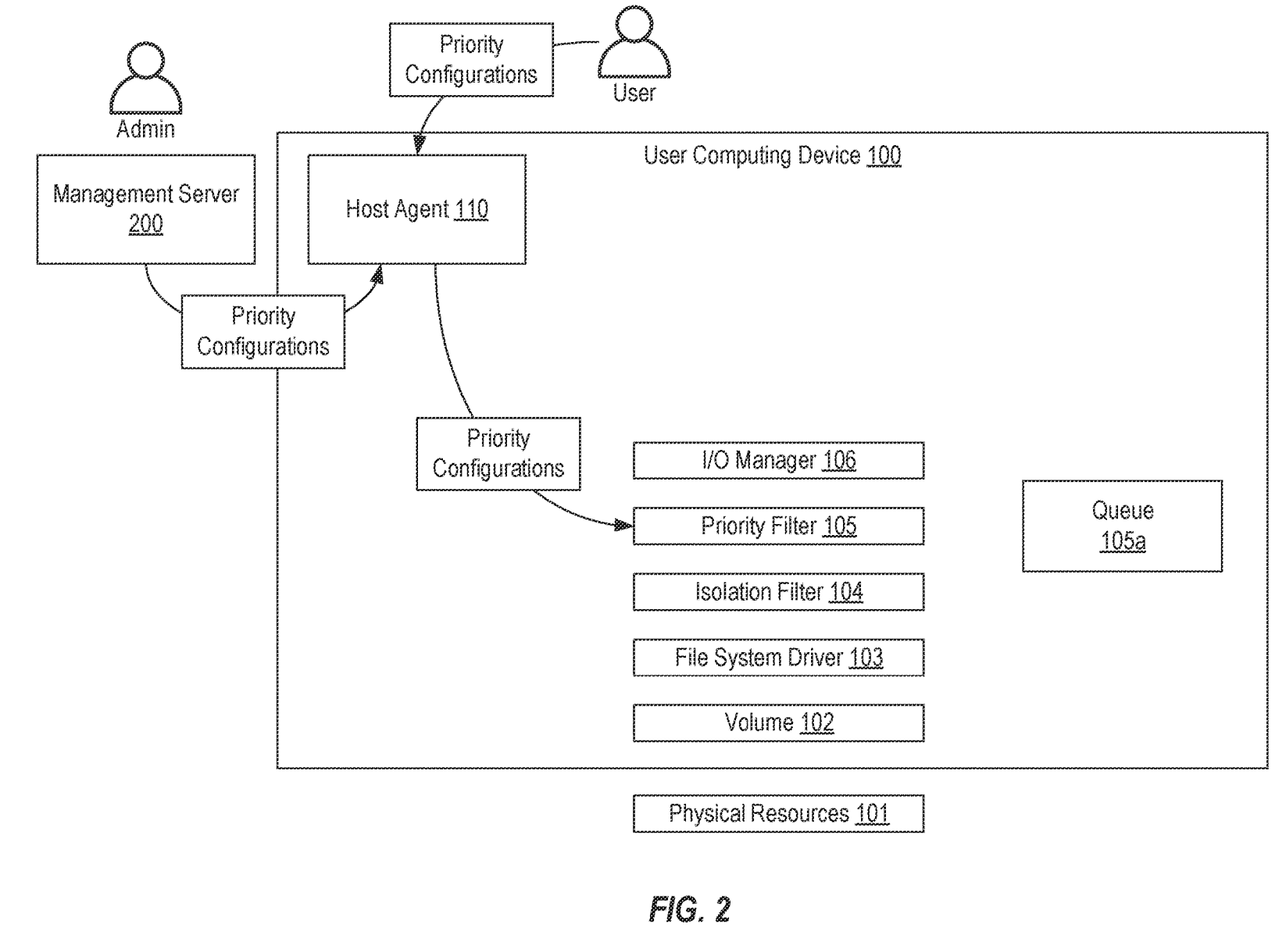
FIG. 2 provides an example of how priority configurations can be provided to a priority filter for use in implementing quality of service for secure workspaces having copy-on-write layers in accordance with embodiments of the present invention.

FIG. 2 represents how priority configurations can be provided to priority filter 105. As shown, an administrator may use management server 200 to define and send priority configurations to host agent 110. A user could also or alternatively interface locally with host agent 110 to define priority configurations. In any case, host agent 110 can make the priority configurations accessible to priority filter 105. For example, host agent 110 could store the priority configurations in a configuration file accessible to priority filter 105 or could send the priority configurations to priority filter 105 such as via IOCTLs. Priority configurations could be defined or updated at any time including before priority filter 105 is loaded and while priority filter 105 is executing.

The priority configurations can define a priority for a secure workspace that may be deployed on user computing device 100 or for a particular application that is hosted in a secure workspace that may be deployed on user computing device 100. For example, the priority configurations could identify secure workspace 120 or app 123 as having a high priority, secure workspace 130 or app 133 as having a normal or low priority, and secure workspace 140 or app 143 as having a high priority. Any suitable metric for defining priority could be used including a Boolean metric (e.g., yes/no), a categorical metric (high/normal/low), a range metric (0-10), etc.

Figure 3A:
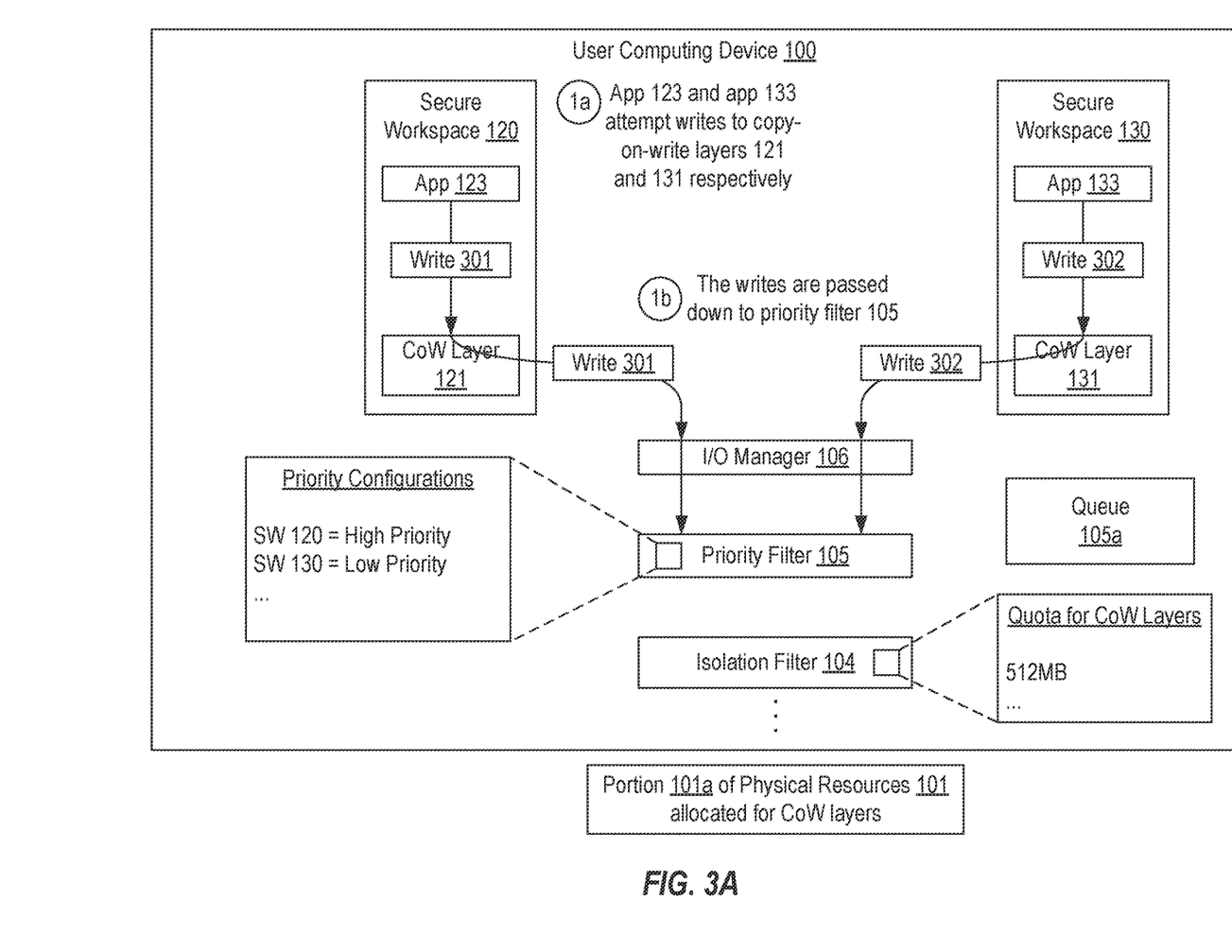
FIGS. 3A-3E provide an example of how quality of service for secure workspaces having copy-on-write layers can be provided in accordance with embodiments of the present invention.

FIGS. 3A-3E provide an example of how quality of service can be provided for secure workspaces having copy-on-write layers. In this example, and as represented in FIG. 3A, it is assumed that secure workspaces 120 and 130 have been deployed on user computing device 100 and are configured to use copy-on-write layers 121 and 131 respectively. The content of copy-on-write layers 121 and 131 will exist in a portion 101a of physical resources 101 that is allocated to copy-on-write layers. It is also assumed that a quota of 512 MB has been defined for portion 101a. As shown, isolation filter 104 can be configured to enforce this quota as part of directing I/O requests to portion 101a. It is further assumed that priority filter 105 has received priority configurations which assign a high priority to secure workspace 120 and a low priority to secure workspace 130.

In step 1a, it is assumed that app 123 attempts a write 301 and that app 133 attempts a write 302. Because secure workspaces 120 and 130 are configured to use copy-on-write layers 121 and 131 respectively, writes 301 and 302 will be directed towards portion 101a of physical resources 101. However, because priority filter 105 is loaded above isolation filter 104, writes 301 and 302 will be passed down the I/O stack to priority filter 105 in step 1b. Writes 301 and 302 could occur at any time and need not occur at the same time.

Figure 3B:
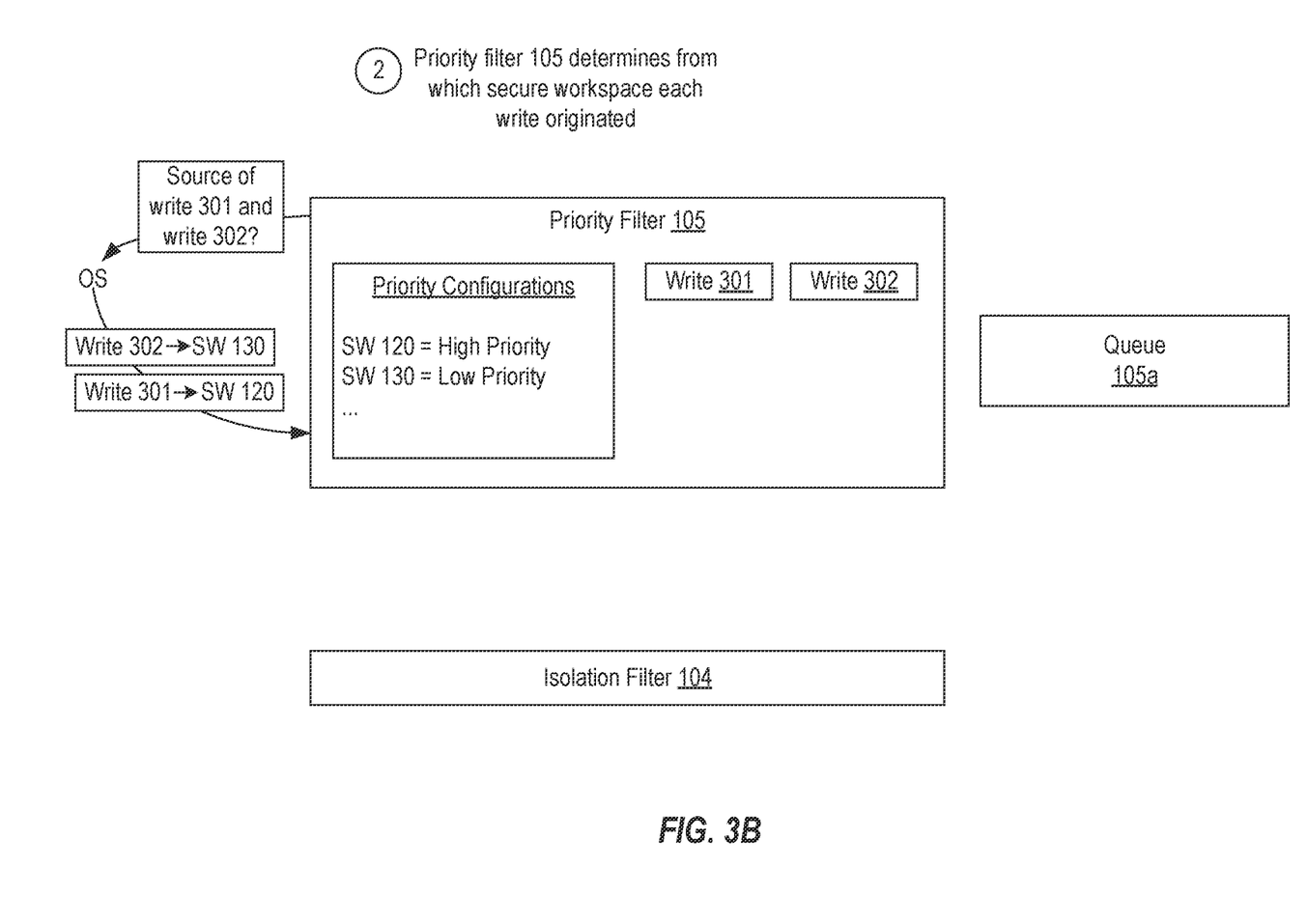

Turning to FIG. 3B, in step 2 and as part of its handling of writes 301 and 302, priority filter 105 can determine from which secure workspace each write originated. For example, priority filter 105 could leverage one or more operating system APIs to obtain a process ID of secure workspaces 120 and 130 respectively or some other identifier or information associated with writes 301 and 302 (e.g., content of the I/O request packets defining the writes) to determine that secure workspace 120 is the source of write 301 and that secure workspace 130 is the source of write 302. As part of step 2, priority filter 105 could also first determine that writes 301 and 302 target a copy-on-write layer (e.g., priority filter 105 may simply pass down any I/O requests that do not target a copy-on-write layer).

Figure 3C:
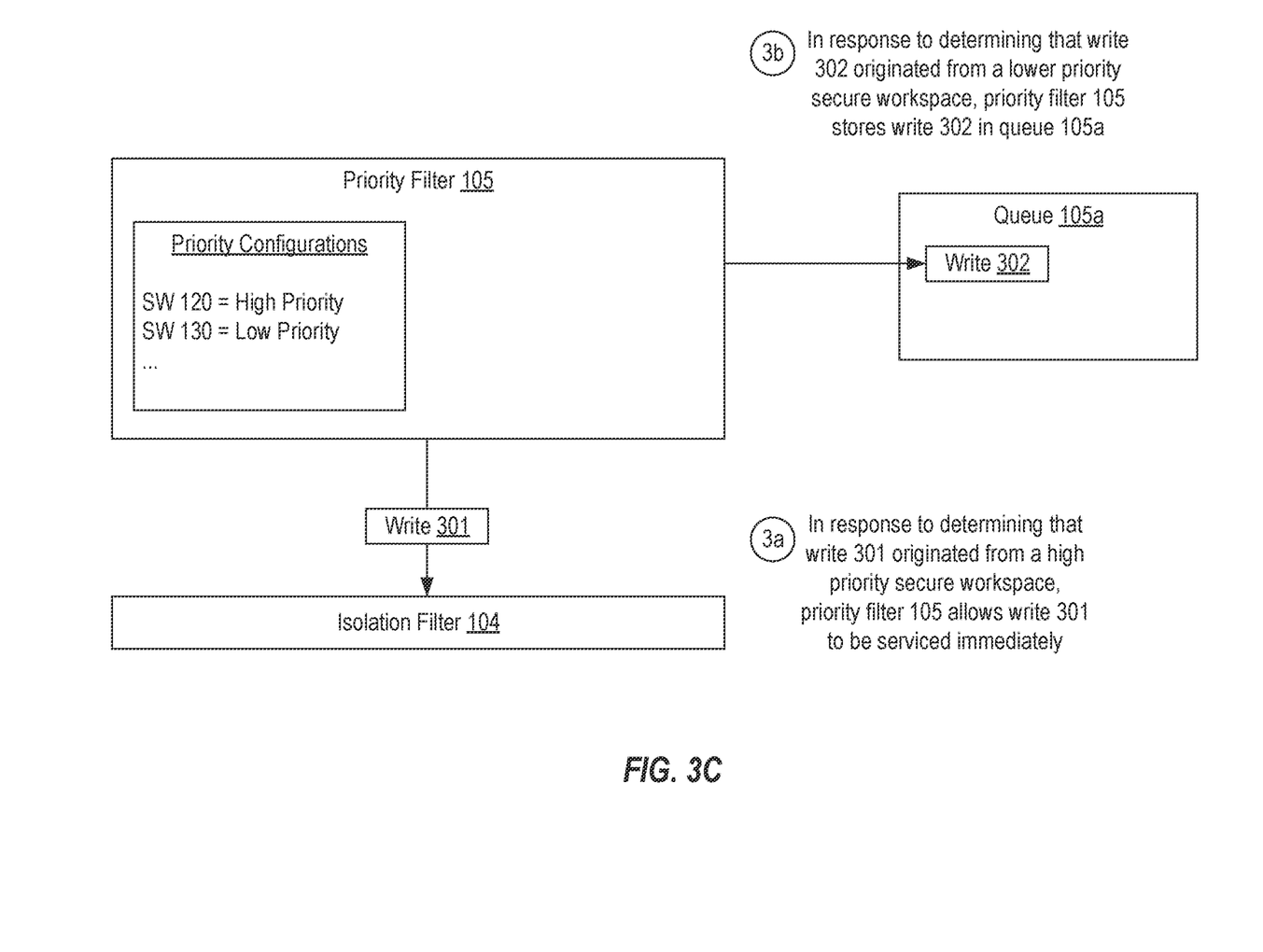

Turning to FIG. 3C, in step 3a and in response to determining that write 301 originated from a high priority secure workspace, secure workspace 120, priority filter 105 can allow write 301 to be serviced immediately by passing write 301 to isolation filter 104. In contrast, in step 3b and in response to determining that write 302 originated from a lower priority secure workspace, secure workspace 130, priority filter 105 can store write 302 in queue 105a as opposed to immediately passing write 302 down to isolation filter 104. As represented in FIG. 3C, in some embodiments, priority filter 105 could determine the priority of a write by accessing the priority configurations to determine the priority assigned to the secure workspace that is the source of the write.

Figure 3D:
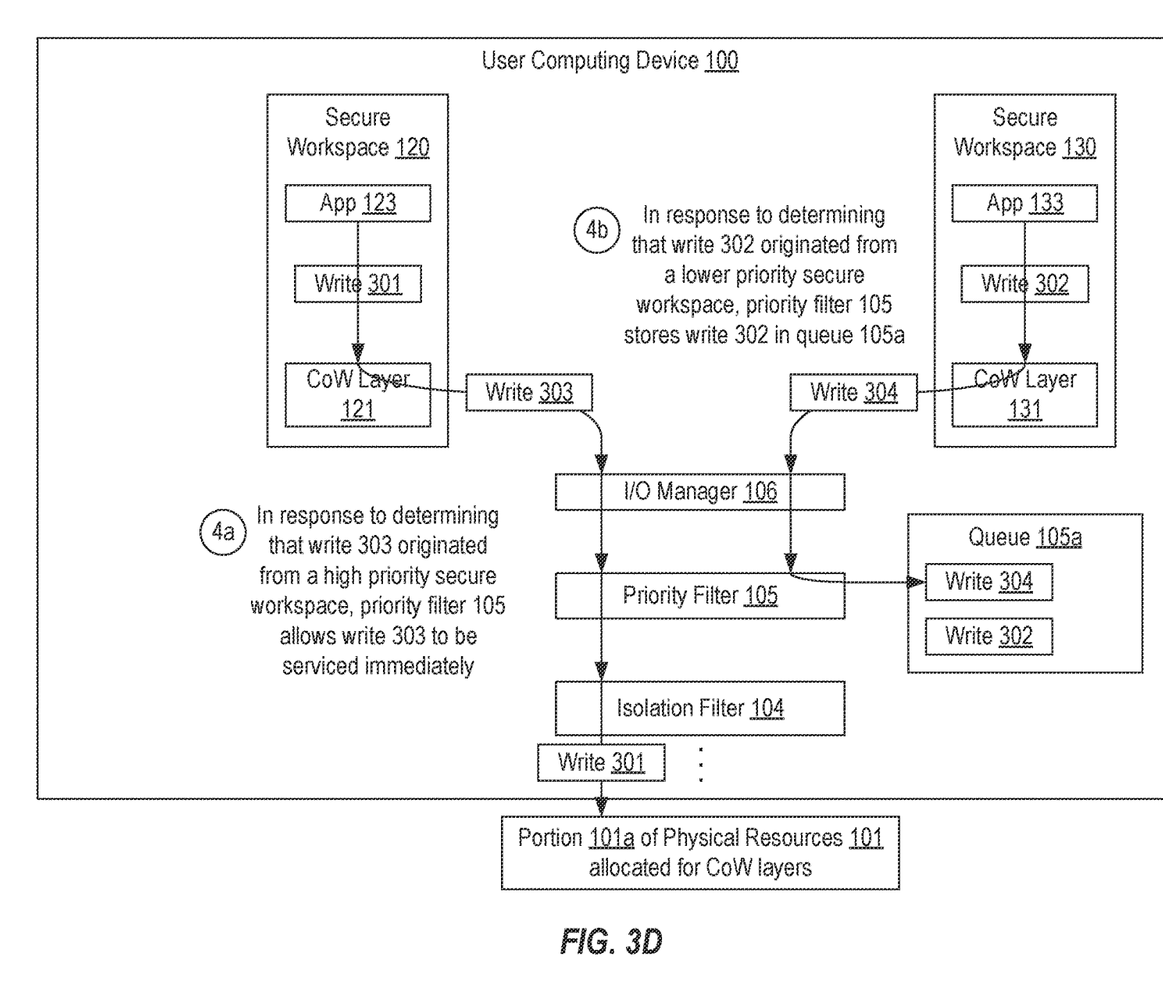

Turning to FIG. 3D, it is now assumed that app 123 and app 133 make additional writes 303 and 304 respectively. FIG. 3D also represents that write 301 is being serviced while write 302 remains in queue 105a. In step 4a and like step 3a, priority filter 105 can determine that write 303 originated from secure workspace 120 and allow write 303 to be serviced immediately. In step 4b and like step 3b, priority filter 105 can determine that write 304 originated from secure workspace 130 and store write 304 in queue 105a. Notably, if write 302 and/or write 304 would have caused portion 101a of physical resources 101 that is allocated for copy-on-write layers to reach the quota, writes 301 and 303 can still be serviced because priority filter 105 stored writes 302 and 304 in queue 105a. In this way, priority filter 105 can minimize the risk that writes originating from lower priority sources will exhaust the quota for copy-on-write layers.

Figure 3E:
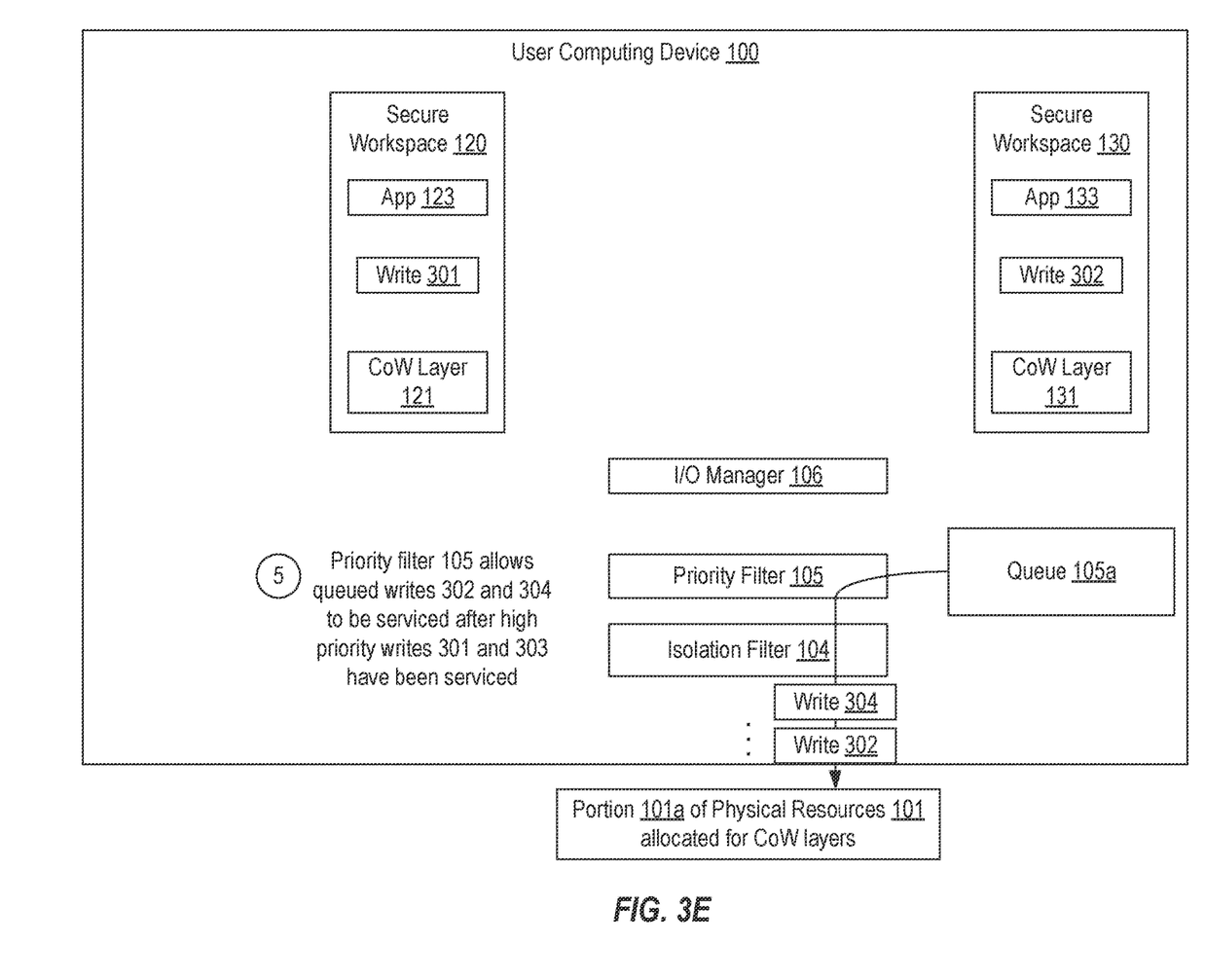

Turning to FIG. 3E, it is now assumed that app 123 is no longer generating writes and that writes 301 and 303 have been serviced. In step 5, priority filter 105 can remove writes 302 and 304 from queue 105a and pass them down to isolation filter 104 for servicing. In some embodiments, priority filter 105 could perform step 5 after a specified amount of time. For example, upon storing a write in queue 105a, priority filter 105 could set a timer. Once the timer elapses, priority filter 105 could begin resuming the queued writes. In some embodiments, priority filter 105 could resume the queued writes in the order in which they were received. In other embodiments, priority filter 105 could resume the queued writes in an order based on their priorities (e.g., resuming normal priority writes before low priority writes).

In some embodiments, priority filter 105 may consider the amount of resources that remain available to copy-on-write layers prior to resuming a queued write. For example, if portion 101a has reached or exceeded a threshold percentage of the quota, priority filter 105 may deny writes 302 and/or 304 (e.g., by completing them with an error code) as opposed to passing them down to isolation filter 104. This can ensure that app 123 (or another high priority app or secure workspace) will remain able to write to copy-on-write layer 121.

Figure 4:
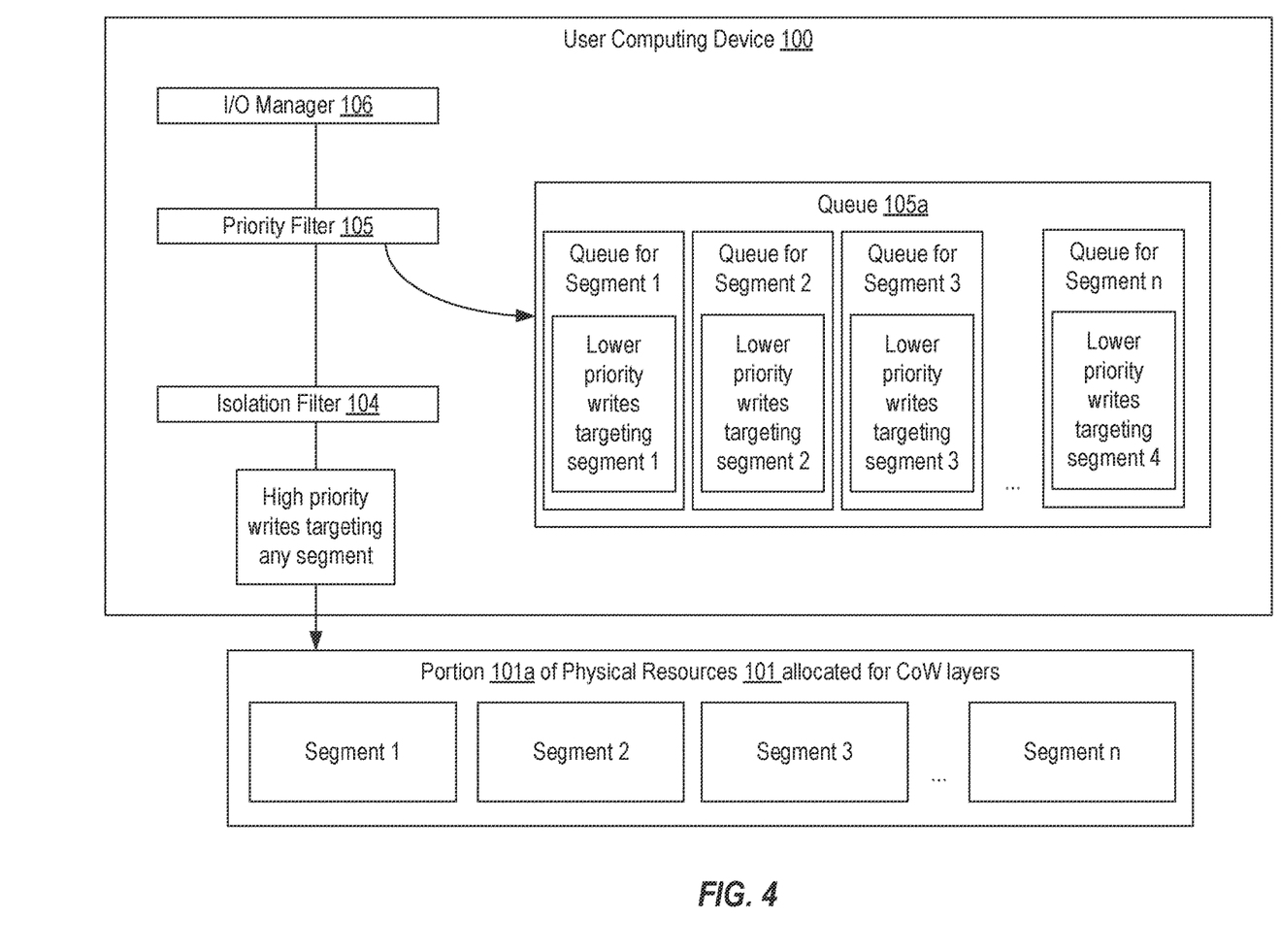
FIG. 4 provides an example of how a priority filter can implement a segmented queue for storing lower priority I/O requests targeting segments used to store content of copy-on-write layers in accordance with embodiments of the present invention.

FIG. 4 provides an example where priority filter 105 implements queue 105a as a segmented queue matching segments of portion 101a of physical resources 101 that are allocated for copy-on-write layers. In other words, when portion 101a is segmented (e.g., using memory segmentation techniques), queue 105a may include sub-queues for each segment and priority filter 105 may store writes that target a particular segment in the sub-queue corresponding to the particular segment. In such cases, priority filter 105 may perform step 5 on a per-sub-queue basis. For example, if there are no high priority writes targeting a particular segment, priority filter 105 can service writes that are stored in the sub-queue for the particular segment even if there may be high priority writes targeting other segments.

In the example of FIGS. 3A-3E, priority filter 105 applies the priority configurations at the secure workspace level. This technique may be most suitable in embodiments where each secure workspace hosts a single application. In embodiments where multiple applications are hosted in a secure workspace, priority filter 105 can apply the priority configurations at the application level to prioritize the writes of one application over the writes of another application in the same secure workspace.

Figure 5:
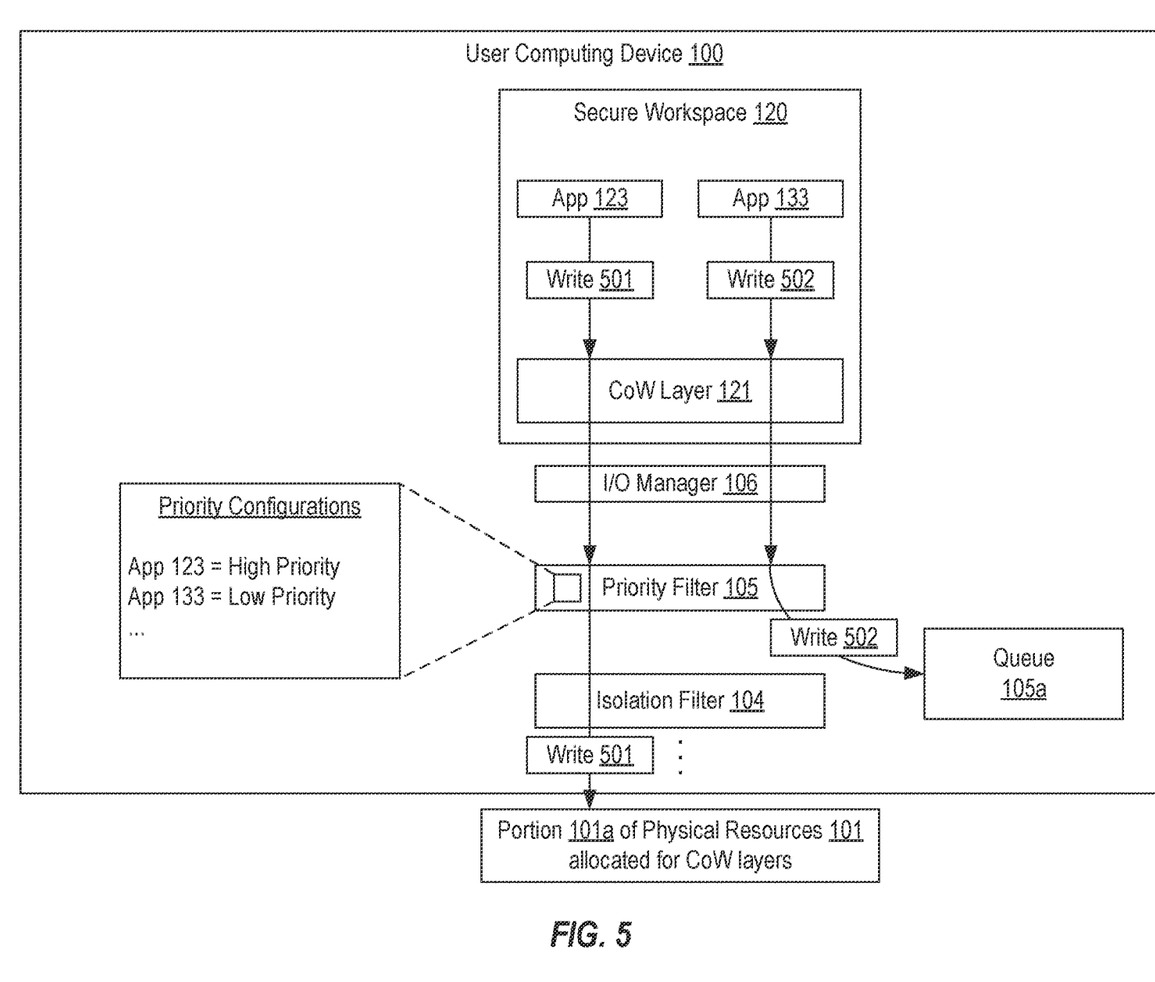
FIG. 5 provides an example of how quality of service for secure workspaces having copy-on-write layers can be provided when multiple applications are hosted in a single secure workspace in accordance with embodiments of the present invention.

FIG. 5 provides an example where app 123 and app 133 are both hosted in secure workspace and the priority configurations assign a high priority to app 123 and a low priority to app 133. As represented, priority filter 105 can immediately service write 501 and can store write 502 in queue 105a in the manner described above. However, to determine that write 501 pertains to app 123 and that write 502 pertains to app 133, priority filter 105 may access attributes of each write. For example, priority filter 105 could read the WCIFS_REDIRECTION_ECP_CONTEXT structure associated with each write to identify the source of the write based on context.

Figure 6:
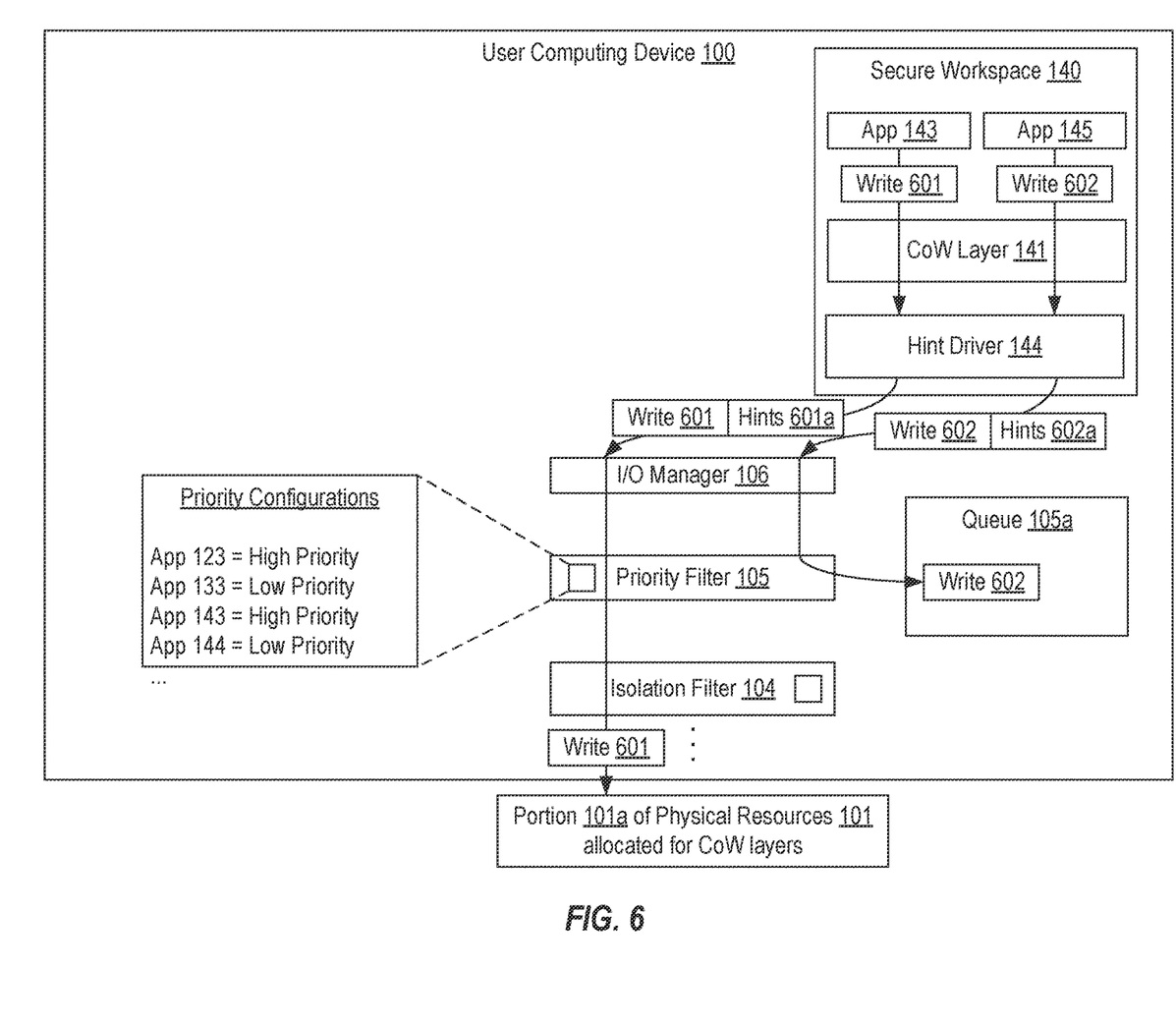
FIG. 6 provides an example of how a hint driver can be employed inside a secure workspace to provide hints to a priority filter to allow the priority filter to implement quality of service for the secure workspace in accordance with embodiments of the present invention.

FIG. 6 provides an example where app 143 and app 145 are hosted in secure workspace 140 which is a virtual machine. Because secure workspace 140 is a virtual machine, hint driver 144 can be loaded below copy-on-write layer 141 so that it receives write 601 and write 602 before the writes are redirected to the host operating system environment. Hint driver 144 can be configured to associate hints with each write that targets copy-on-write layer 141 where the hints can be used by priority filter 105 to determine which application was the source of the write. For example, hint driver 144 could create extra create parameters (ECPs) in which the application and/or its priority is identified and associate the ECPs with each write. Accordingly, writes 601 and 602 are shown as being associated with hints 601a and 602a respectively when they are passed down to priority filter 105. Priority filter 105 could then use the priority configurations and hints 601a and 602a to determine that write 601 should be immediately serviced while write 602 should be stored in queue 105a to thereby prevent app 145 from consuming excessive amounts of copy-on-write layer 141.

In each of the examples above, priority filter 105 has provided quality of service by prioritizing writes. In some embodiments, priority filter 105 may additionally or alternatively provide quality of service by limiting the number of writes, limiting the bandwidth of writes, etc. For example, priority filter 105 could limit a low priority secure workspace or application to a specified number of writes in a given time period. As another example, priority filter 105 could cap the I/O bandwidth that a low priority secure workspace or application could consume with its writes. In each of these examples, priority filter 105 could use queue 105a to delay or block the servicing of such writes to ensure that the quality of service configurations are met.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a priority filter, for providing quality of service for secure workspaces having copy-on-write layers, the method comprising:
    loading the priority filter in an I/O subsystem above an isolation filter such that I/O requests passed down the I/O subsystem are received by the priority filter before the isolation filter, wherein the isolation filter is configured to enforce a quota that is defined for a portion of physical storage resources that are allocated to one or more copy-on-write layers corresponding to one or more secure workspaces;
    receiving, at the priority filter, a first write that targets a first copy-on-write layer of the one or more copy-on-write layers, the first write originating from the one or more workspaces;
    determining that the first write targets the first copy-on-write layer and is associated with a first priority;
    based on the determination that the first write targets the first copy-on-write layer and is associated with the first priority, allowing the first write to be serviced immediately by the isolation filter;
    receiving a second write that targets a second copy-on-write layer of the one or more copy-on-write layers, the second write originating from the one or more workspaces;
    determining that the second write targets the second copy-on-write layer and is associated with a second priority; and
    based on the determination that the second write targets the second copy-on-write layer and is associated with the second priority, preventing the second write from being serviced immediately by the isolation filter.

2. The method of claim 1, wherein the first priority is a high priority and the second priority is a lower priority.

3. The method of claim 1, wherein the first copy-on-write layer and the second copy-on-write layer are the same copy-on-write layer.

4. The method of claim 1, wherein the first copy-on-write layer and the second copy-on-write layer are different copy-on-write layers.

5. The method of claim 1, wherein preventing the second write from being serviced immediately by the isolation filter comprises storing the second write in a queue.

6. The method of claim 5, wherein the queue is segmented.

7. The method of claim 1, wherein the first write originates from a first secure workspace of the one or more secure workspaces and the second write originates from a second secure workspace of the one or more secure workspaces.

8. The method of claim 1, further comprising:
allowing the second write to be serviced by the isolation filter after the first write is serviced by the isolation filter.

9. The method of claim 7, wherein the first write is determined to be associated with the first priority based on determining that the first write originated from the first secure workspace.

10. The method of claim 1, wherein determining that the first write is associated with the first priority comprises determining that the first write originated from a first application.

11. The method of claim 1, wherein determining that the first write is associated with the first priority comprises accessing one or more hints associated with the first write.

12. The method of claim 1, wherein preventing the second write from being serviced immediately comprises limiting a bandwidth of a source of the second write.

13. The method of claim 1, wherein preventing the second write from being serviced immediately comprises limiting a number of writes that a source of the second write can make during a period of time.

14. The method of claim 1, wherein determining that the first write is associated with the first priority comprises accessing priority configurations.

15. One or more computer storage media storing computer executable instructions which when executed implement a priority filter that is configured to perform a method for providing quality of service for secure workspaces having copy-on-write layers, the method comprising:
loading the priority filter in an I/O subsystem above an isolation filter such that I/O requests passed down the I/O subsystem are received by the priority filter before the isolation filter, wherein the isolation filter is configured to enforce a quota that is defined for a portion of physical storage resources that are allocated to one or more copy-on-write layers corresponding to one or more secure workspaces;
receiving, at the priority filter, a first write that targets a first copy-on-write layer of the one or more copy-on-write layers, the first write originating from the one or more workspaces;
determining that the first write targets the first copy-on-write layer and is associated with a first priority;
based on the determination that the first write targets the first copy-on-write layer and is associated with the first priority, allowing the first write to be serviced immediately by the isolation filter;
receiving a second write that targets a second copy-on-write layer of the one or more copy-on-write layers, the second write originating from the one or more workspaces;
determining that the second write targets the second copy-on-write layer and is associated with a second priority; and
based on the determination that the second write targets the second copy-on-write layer and is associated with the second priority, preventing the second write from being serviced immediately by the isolation filter.

16. The computer storage media of claim 15, wherein the method further comprises:
receiving priority configurations that define a priority of one or both of:
secure workspaces; or
applications; and
wherein the priority filter uses the priority configurations to determine the first and second priorities.

17. The computer storage media of claim 15, wherein preventing the write from being serviced immediately by the isolation filter comprises causing the write to be serviced after a period of time has elapsed.

18. The computer storage media of claim 15, wherein preventing the write from being serviced immediately by the isolation filter comprises failing the write.

19. A system comprising:
a management server; and
one or more user computing devices, each user computing device including a host agent that receives priority configurations from the management server, each user computing device also including a priority filter that is configured to perform a method for providing quality of service for secure workspaces having copy-on-write layers, the method comprising:
loading the priority filter in an I/O subsystem above an isolation filter such that I/O requests passed down the I/O subsystem are received by the priority filter before the isolation filter, wherein the isolation filter is configured to enforce a quota that is defined for a portion of physical storage resources that are allocated to one or more copy-on-write layers corresponding to one or more secure workspaces;
receiving, at the priority filter, a first write that targets a first copy-on-write layer of the one or more copy-on-write layers, the first write originating from the one or more workspaces;
determining that the first write targets the first copy-on-write layer and is associated with a first priority, wherein the first priority is determined based on the priority configurations;
based on the determination that the first write targets the first copy-on-write layer and is associated with the first priority, allowing the first write to be serviced immediately;
receiving a second write that targets a second copy-on-write layer of the one or more copy-on-write layers, the second write originating from the one or more workspaces;
determining that the second write targets the second copy-on-write layer and is associated with a second priority, wherein the second priority is determined based on the priority configurations; and
based on the determination that the second write targets the second copy-on-write layer and is associated with the second priority, preventing the second write from being serviced immediately.

20. The system of claim 19, wherein the priority configurations define a priority for each of the one or more secure workspaces or for one or more applications hosted in the one or more secure workspaces.

* * * * *